Figure 1:
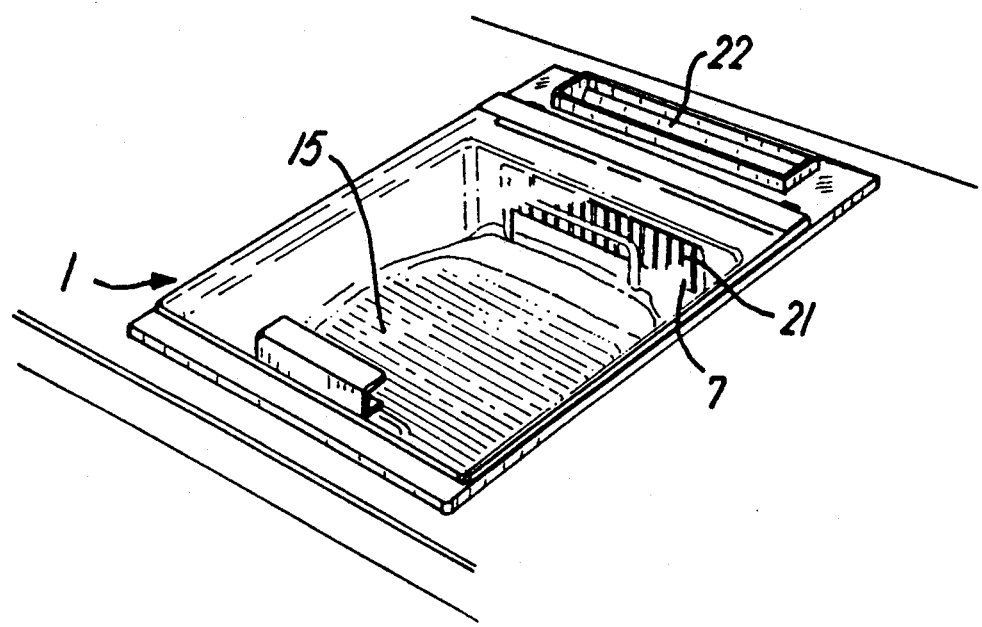

United States Patent [19]
Smit

[11] Patent Number: 5,280,749
[45] Date of Patent: Jan. 25, 1994

[54] FRYING APPARATUS, IN PARTICULAR FOR GRILLING

[75] Inventor: Dico Smit, Barendrecht, Netherlands

[73] Assignee: A/S Ernst Voss Fabrik, Fredericia, Denmark

[21] Appl. No.: 678,300

[22] PCT Filed: Sep. 5, 1989

[86] PCT No.: PCT/DK89/00207
§ 371 Date: Apr. 8, 1991
§ 102(e) Date: Apr. 8, 1991

[87] PCT Pub. No.: WO90/02508
PCT Pub. Date: Mar. 22, 1990

[30] Foreign Application Priority Data
Sep. 7, 1988 [DK] Denmark .............................. 4971/88

[51] Int. Cl.⁵ .............................................. A47J 37/06
[52] U.S. Cl. ........................................... 99/422; 99/447; 99/476; 219/400; 219/408; 219/443
[58] Field of Search ................ 99/401, 422, 447, 450, 99/476; 126/21 A; 219/393, 399, 400, 408, 443, 454

[56] References Cited

U.S. PATENT DOCUMENTS

| 2,220,414 | 11/1940 | Kritzer | 99/447 |
| 2,688,808 | 9/1954 | Ipsen | 219/400 |
| 3,327,094 | 6/1967 | Martin et al. | 219/393 |
| 4,133,336 | 1/1979 | Smith | 219/400 |

FOREIGN PATENT DOCUMENTS

| 516421 | 1/1953 | Belgium | 99/476 |
| 10540 | 3/1907 | Denmark . | |
| 812588 | 9/1951 | Fed. Rep. of Germany . | |
| 9598513 | 3/1957 | Fed. Rep. of Germany | 219/399 |
| 2422632 | 12/1975 | Fed. Rep. of Germany . | |
| 2521420 | 11/1976 | Fed. Rep. of Germany | 99/447 |
| 2640684 | 3/1977 | Fed. Rep. of Germany | 126/21 A |
| 870647 | 11/1940 | France . | |
| 870852 | 11/1940 | France . | |
| 131939 | 8/1982 | Japan | 219/400 |
| 161428 | 10/1982 | Japan | 126/21 A |
| 8008749-7 | 2/1988 | Sweden . | |
| 150326 | 5/1951 | United Kingdom | 219/400 |
| 8700261 | 1/1987 | World Int. Prop. O. | 219/400 |

Primary Examiner—Harvey C. Hornsby
Assistant Examiner—Mark Spisich
Attorney, Agent, or Firm—Browdy and Neimark

[57] ABSTRACT

In a frying apparatus, in particular for grilling, an electric heating device with a contact frying surface is positioned in a mainly box-shaped cabinet with an up-turned opening that may be closed at a distance above the contact frying surface by a preferably transparent cover plate. Structure is provided in connection with the cabinet for conditioning the atmosphere above the contact frying surface at a temperature and air humidity suitable for a specific frying operation, together with an air exhaust for the removal of vapor, fatty particles, smoke and smell from the atmosphere. An air flow of a specific quantity and at controlled temperature and passing substantially horizontally is provided across the contact frying surface towards the air exhaust positioned at one lateral wall of the cabinet, a preferably catalytic filtering device being provided in association with the air exhaust.

15 Claims, 4 Drawing Sheets

FRYING APPARATUS, IN PARTICULAR FOR GRILLING

The invention relates to a frying apparatus, in particular for grilling, including an electric heating device with a contact frying surface.

In conventional ovens not using a contact frying surface, as disclosed e.g. in DK-A-10540 it is well known in general to provide means for conditioning the oven atmosphere by heating and producing a desired air circulation.

The grilling of meat and fish products by means of electric heat sources may either be effected in a closed oven by means of an electric radiant heat element which from above irradiates the meat or fish product placed on a grid or grill pan by simultaneous ventilation of the interior of the oven, or by means of an open grilling apparatus, the meat or fish product being then placed in contact with an underlying frying surface generally profiled with raised ribs to provide the same effect as obtained by a conventional grill.

Open grills are known both in small-size designs as table grills for domestic use as well as in largersize designs, e.g. for use in restaurant kitchens. In such open grills water vapour, fatty particles, smoke and smell generated during grilling will be given off directly to the environments so that the frying process when taking place indoor must generally be effected under a cooker hood having a high induced draught and filtering capacity.

On this background it is an object of the invention to provide an electric frying apparatus, particularly fitted for grilling, by which grilling may be effected indoor while maintaining the desired properties characteristic of said form of frying, substantially without giving off vapour, fatty particles, smoke and annoying smell to the environments.

This is obtained according to the invention by a frying apparatus of the referenced type in that the heating device with the contact frying surface is positioned in a mainly box-shaped cabinet with an upturned opening that may be closed at a distance above the contact frying surface by a preferably transparent cover plate, an air exhaust being positioned at one lateral wall of the cabinet conditioning means being provided in connection with the cabinet for conditioning means being provided in connection with the cabinet for conditioning the atmosphere between the contact frying surface and the cover plate, by provision of an air flow passing substantially horizontally across the contact frying surface towards the air exhaust when the cover plate is mounted, means being provided for controlling the temperature and the amount of air of said air flow to produce temperature and air humidity conditions suitable for a specific frying operation, and means being provided at the air exhaust for the removal of vapour, fatty particles, smoke and smell from said atmosphere.

The frying apparatus according to the invention thus fulfills the conditions necessary to obtain optimum grilling as regards temperature and air humidity in a closed atmosphere from which vapour, fatty particles, smoke and smell may be removed through an appropriate air exhaust.

Even though the invention particularly has grilling for its object it is not restricted thereto, the frying apparatus being as well applicable for other forms of frying, such as so-called deep-frying, by regulation of the conditioning to the desired temperature and humidity conditions.

If it is possible on the site of installation of the frying apparatus to connect the air exhaust with a suitably dimensioned air exhaust passage discharging into the open air, the conditioning air flow may incidentally be provided by natural draught and reasonably good frying results can be obtained without further precautions.

In connection with the air exhaust it is, however, preferred to arrange a filtering device in connection with the air exhaust for the removal of vapour, fatty particles, smoke and smell.

In places where it is not possible to establish a correctly dimensioned air exhaust passage to the open air it is, moreover, preferred that the conditioning means include a fan mounted in connection with an air intake in one lateral wall of the cabinet.

A filtering device of the above mentioned type may according to the invention particularly include a catalytic filter and means for preheating said filter.

A particularly preferred embodiment of the invention is characterized in that the cabinet is carried out with a relatively low height, that the electric heating device is positioned with upwards facing contact frying surface approximately centrally of the cabinet in the height direction thereof and at a distance from the cover plate as well as from a bottom wall of the cabinet, that said filtering device and fan are positioned at the same side of the cabinet on a level above and below, respectively, the contact frying surface, and that a shielding is provided around the electric heating device which guides the air current generated by the fan along a flow path beneath the heating device and back in the opposite direction across the contact frying surface.

The grill according to the invention may thus be designed as a cabinet for installation in a table arrangement, e.g. in connection with a system of electrically heated hot plates.

Figure 2:
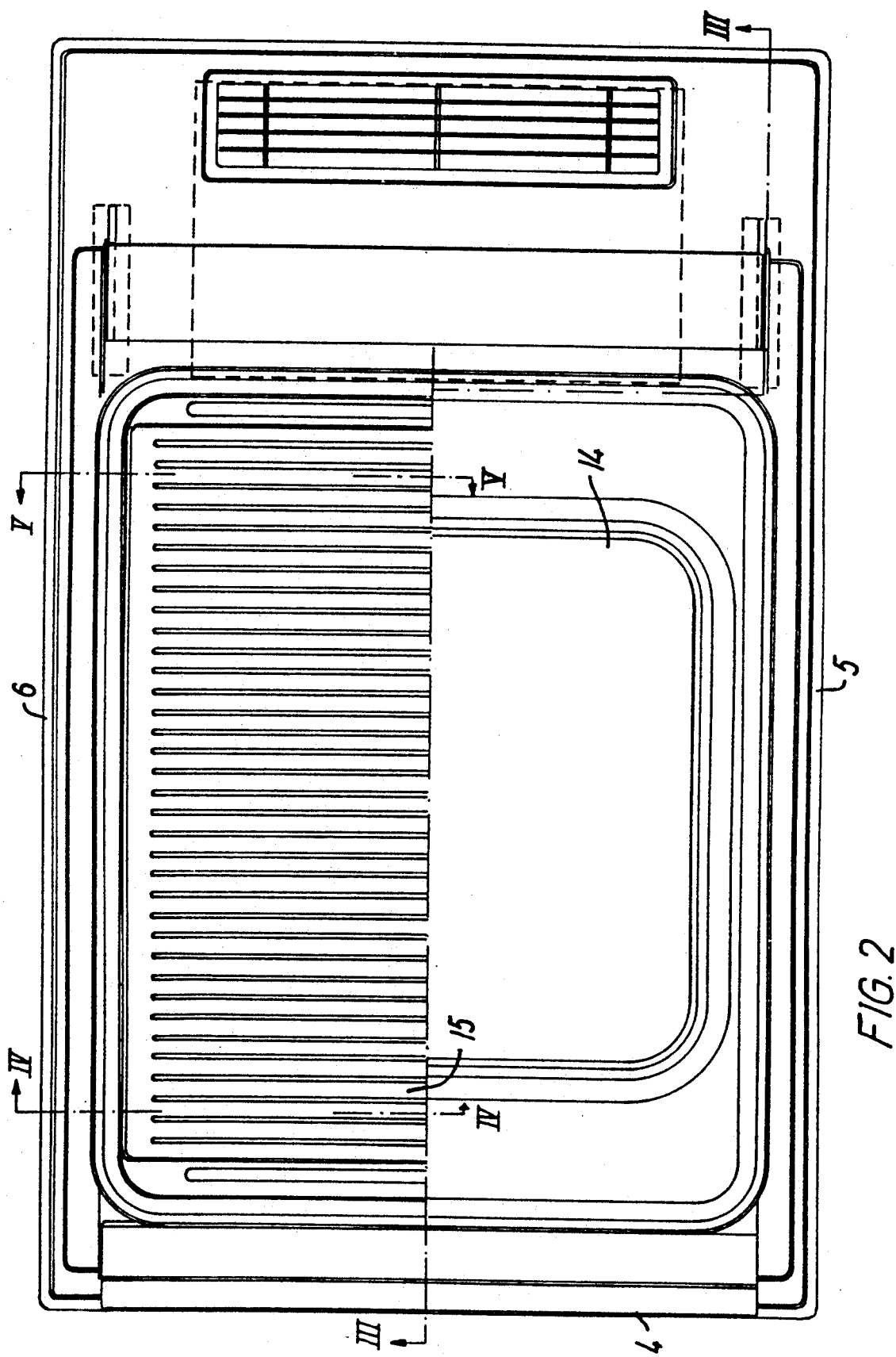
Figure 3:
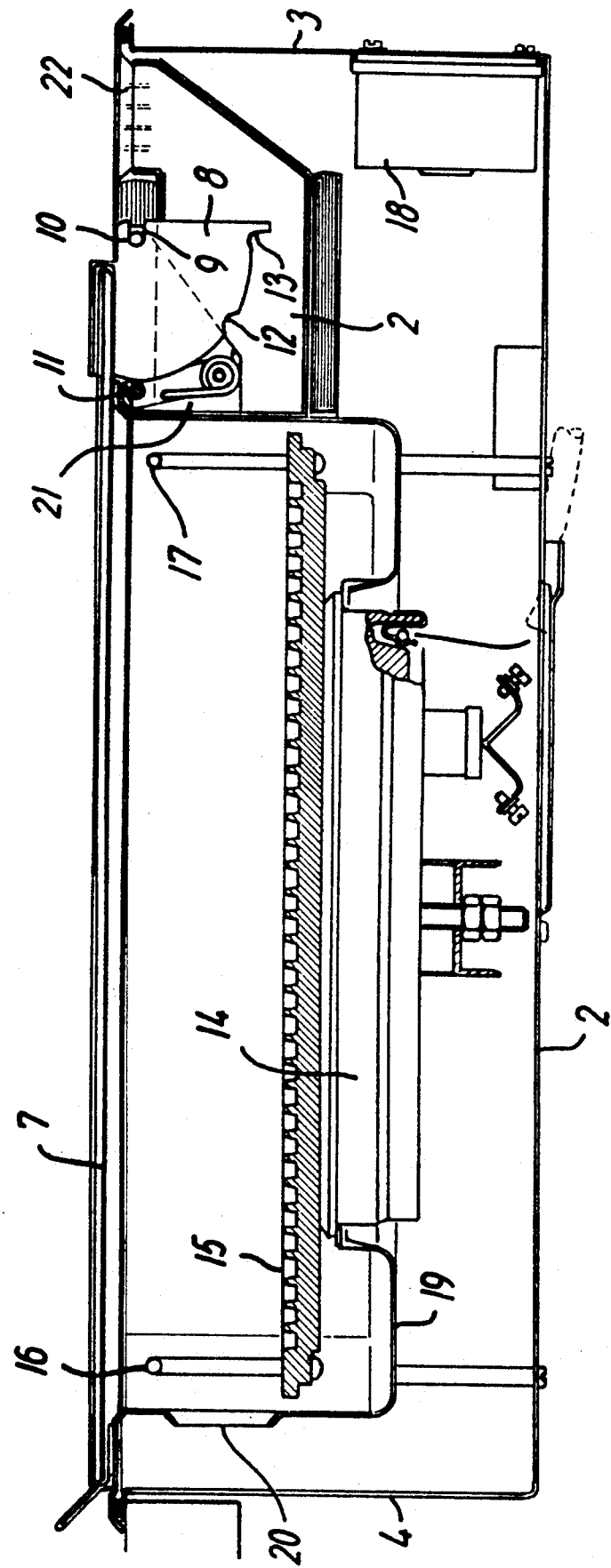
Figure 4:
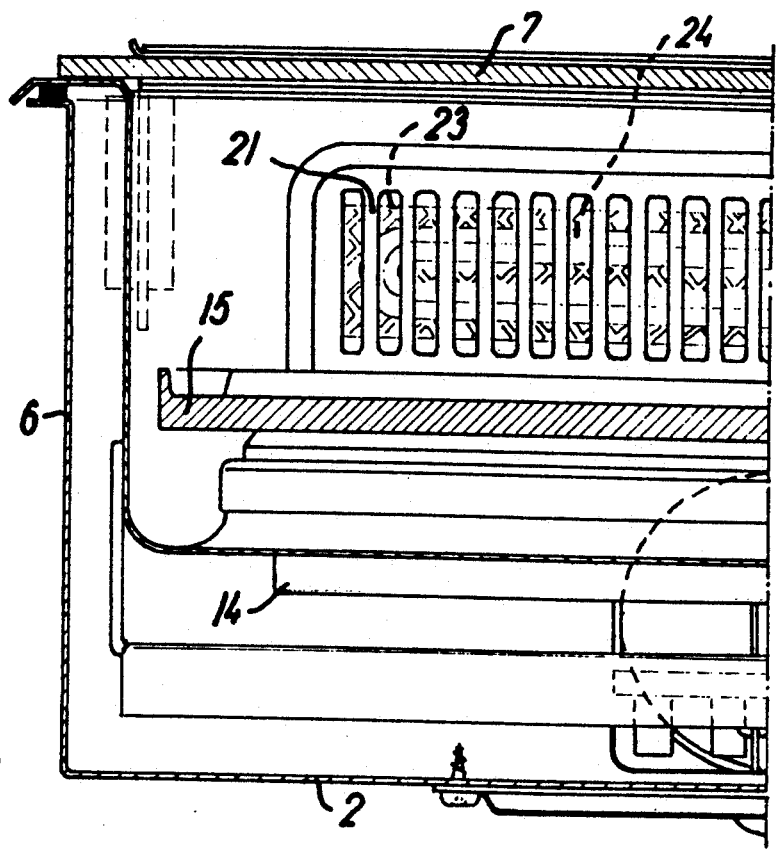
Figure 5:
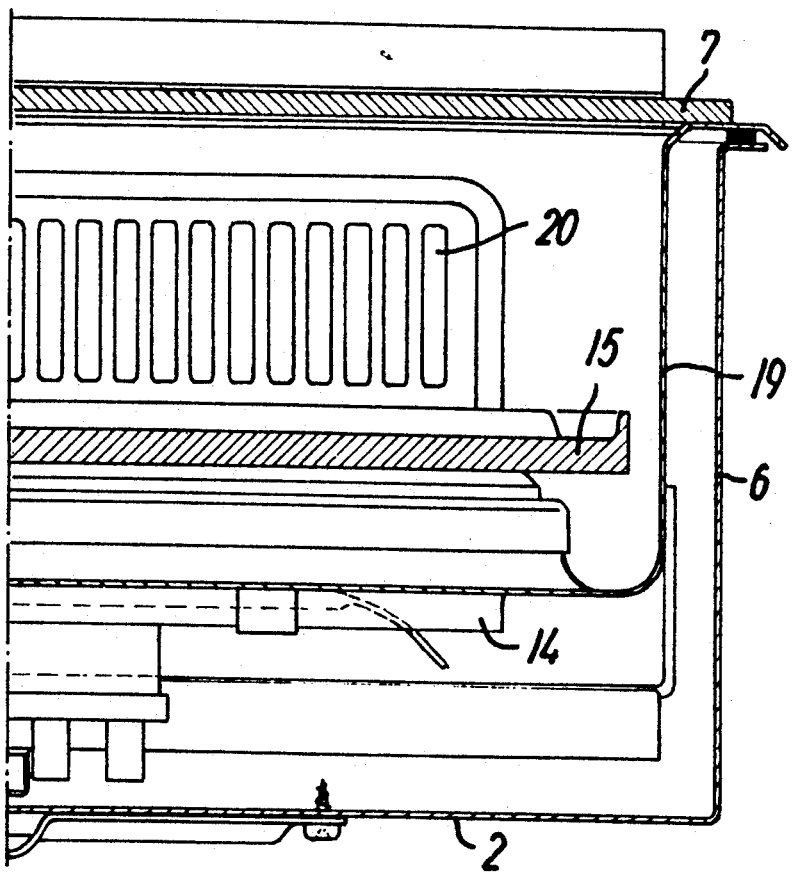

The invention will now be explained in detail with reference to the drawings, in which FIG. 1 is a perspective view of an embodiment of a frying apparatus according to the invention designed as a grill cabinet for installation, FIG. 2 is a sectional plan view of the frying apparatus in FIG. 1, FIG. 3 is a longitudinal section along the lines III—III in FIG. 2, and FIGS. 4 and 5 are cross-sectional views along the lines IV—IV and V—V in FIG. 2.

In the illustrated embodiment the upwards open, substantially box-shaped cabinet 1 having a bottom wall 2, opposite end walls 3 and 4 and lateral walls 5 and 6 extending therebetween, is carried out in a conventional manner as a steel plate structure prepared by bending and fillet weld.

The up-turned opening of cabinet 1 is covered by a transparent cover plate 7 preferably made from tempered glass and which, as illustrated in FIG. 3, is hingedly connected with the lateral walls of the cabinet. As shown, the hinge connection may be provided in that corner flanges 8 substantially shaped as sectors of a circle and secured to cover plate 7 at one end thereof have an incision 9 for rotation about a pivot pin or shaft 10. A pin 11 fixed in lateral wall 5 and 6, respectively, keeps flange 8 in place, incision 9 being located about pivot pin or shaft 10. By engagement with incisions 12 and 13 provided for that purpose, the stationary pin or shaft 11 may serve to retain cover plate 7 in two different open angular positions, e.g. at opening angles of 55° and 90°, resp., in relation to the closing position illustrated in FIG. 3.

Cabinet 1 of comparatively low height accommodates an electric heating device comprising as shown a substantially square large-scale hot plate 14 and a grill pan 15 with upwards rib-profiled contact frying surface positioned approximately in midway between bottom wall 2 and cover plate 7. With a view to removal for cleaning, grill pan 15 which may be of a commercial standard type, e.g. of the brand Electrolux, is, on one hand, releasable in relation to the underlying hot plate 14 and, on the other hand, provided with grips 16 and 17.

For the provision of an airflow serving to condition the atmosphere above the contact frying surface of grill pan 15 a fan 18 is mounted in connection with an air intake at one end wall 3 of cabinet 1. By means of a shielding 19 arranged around the heating device 14, 15 and forming an inner cabinet, the airflow generated by fan 18 is guided along a flow path comprising a first stretch in the space between bottom wall 2 and hot plate 14 and a second stretch in the space above the contact frying surface of grill pan 15, the airflow being conducted to said frying surface through an injection grate 20 provided with vertical grate slits and located at the wall of shielding 19 closest to end wall 4 of cabinet 1.

After passage across the contact frying surface the airflow is conducted to an exhaustion grate 21 likewise provided for instance with vertical grate slits and positioned at the opposite wall of shielding 19.

A catalytic filtering device 23 accommodating a heating element 24 for preheating the catalytic filter is mounted between the exhaustion grate 21 and an air outlet opening 22 in the top side of cabinet 1 outside cover plate 7. A catalytic combustion process is effected in a known manner in filter 23, thereby removing to a considerable degree vapour, fatty particles, smoke and annoying smell from the exhausted air before giving it off through opening 22. The evacuated air is thus subjected to cleaning to a degree sufficient to allow it to be given off directly to the open air through opening 22 without the need for an air discharge duct in connection therewith.

Commercially available products may be used for fan 18 as well as for filter 23. For instance a commercially available axial fan of the brand MICRONEL, type V624L, may be chosen as fan 18, while filter 23 may comprise a commercially available dual-catalytic combustor unit of the brand PANAPUEL, type B1-175WS-512C. Catalytic combustor units of said type are particularly intended for use in in wood-burning stoves but have turned out to be appropriate for use in a frying apparatus according to the invention.

The optimizing of the conditioning of the atmosphere above the contact frying surface in order to obtain an effective removal of vapour, fatty particles, smoke and annoying smell before the air flow is given off to space after passage through the catalytic filter, necessitates the provision of balance between a series of partially mutually contradictory factors.

With said commercially available catalytic combustor units it is thus difficult to obtain at the same time an optimum conversion by the combustion of hydrocarbons and oil and by the removal of smoke and smell. It applies, however, to both cases that the conversion is highest at a comparatively low value of the so-called SV-figure (Space Velocity), defining the proportion between the airflow stated in volume per hour and the catalyst cubic capacity. Thus, a low value of the SV-figure necessitates either a very high catalyst capacity or a poor airflow measured in $m^3/h$.

With respect to temperature and air humidity conditioning to optimum conditions of grilling requires at the same time a relatively high volumetric flow velocity, since the air temperature when grilling should be comparatively low, about 50° C., and the relative air humidity should at the same time be kept substantially below 100%.

Tests have shown that it is possible with a frying apparatus according to the invention to obtain completely satisfactory grilling properties by keeping the temperature in the atmosphere above the contact frying surface at about 50° C., at which a sufficiently low air humidity may be maintained for a volumetric air flow of approximately 14 $m^3/h$. At this flow velocity it is possible with a catalytic combustor unit of the above mentioned type to obtain a SV-value of 3, which has shown to give satisfactory results in practice.

In respect of an optimum functioning of the catalytic combustor unit a comparatively high temperature is needed which in the present case is provided by means of the electric heat element 24 that is preferably dimensioned so that the catalyst temperature is kept at least at 275° C.

In order to ensure a quick heating of the catalytic combustor unit to the working temperature the electrical control circuit of the frying apparatus is preferably designed so that fan 18 is started only when the catalyst temperature has attained a determined level.

In order to protect the catalytic combustor unit against overheating when the cover plate is opened in respect of turning a meat or fish product placed on the frying surface, a separate switch controlled by a temperature sensor may be associated with the heating spiral 24.

The heating of the conditioning air flow to a temperature about 50° C. is effected by the passage of the air flow beneath hot plate 14 heated independently of grill pan 15. In view of the fact that the conditioned air flow temperature as mentioned is comparatively critical as regards the frying result, hot plate 14 is thermostat-controlled in a manner known per se.

According to the illustrated embodiment of the frying apparatus grilling is effected by placing the actual meat or fish product on grill pan 15, one side being in contact with the frying surface. The course of frying may be watched through the transparent cover plate 7, the conditioning having turned out to be sufficiently effective to substantially avoid condensation of water on the underside of the cover.

After frying for a prescribed time the cover plate is opened and the slice or piece of meat or fish is turned and fried on the other side. Tests have shown that dirtying of the releasable grill pan 15 may be kept at such a low level that in most cases it is not necessary to remove the grill pan for cleaning which may be effected by wiping it off while being placed within cabinet 1.

Even though the invention has been explained in the preceding solely with a view to grilling, the conditioning principle of removing smoke and smell obtained by the invention may also be adapted to other forms of frying, e.g. fat frying in the form of so-called deep-frying.

I claim:

1. A frying apparatus, for grilling, comprising a mainly box-shaped cabinet having a bottom, lateral walls and an upwardly facing opening, a cover plate for closing said opening, an electric heating device with a substantially horizontal contact frying surface arranged in said cabinet with the contact frying surface positioned at a distance below said opening and above said bottom wall, an air exhaust positioned near one of said lateral walls of the cabinet, means for providing an air flow passing substantially horizontally across the contact frying surface towards the air exhaust when the cover plate closes the opening, means for controlling the temperature and the amount of said air flow to produce temperature and air humidity conditions suitable for a specific frying operation and means provided near the air exhaust for the removal of vapor, fatty particles, smoke and smell from the area between the contact frying surface and the cover plate.

2. A frying apparatus as claimed in claim 1, wherein said cover plate is transparent.

3. A frying apparatus as claimed in claim 1, wherein said means for the removal of vapor, fatty particles, smoke and smell is provided in connection with the air exhaust and comprises a filtering device and a fan.

4. A frying apparatus as claimed in claim 3, wherein said filtering device includes a catalytic filter and means for preheating said filter.

5. A frying apparatus as claimed in claim 4, wherein the cabinet is designed with a relatively low height, the electrical heating device being arranged with a contact frying surface positioned approximately halfway between the cover plate and the bottom of the cabinet, said filtering device and said fan being positioned at a same lateral wall of said lateral walls of the cabinet, respectively spaced at a distance above and below the contact frying surface, and a shielding being provided around the electric heating device to allow the air flow generated by the fan to flow along a path beneath the heating device and back in an opposite direction across the contact frying surface.

6. A frying apparatus as claimed in claim 4, wherein said means for preheating said filter is controlled to preheat the catalytic filter to a temperature of at least 275° C.

7. A frying apparatus as claimed in claim 6, wherein said means for controlling includes a fan mounted in connection with an air intake in said one of said lateral walls of the cabinet.

8. A frying apparatus as claimed in claim 6, wherein the cabinet is designed with a relatively low height, the electrical heating device being arranged with a contact frying surface positioned approximately halfway between the cover plate and the bottom of the cabinet, said filtering device and said fan being positioned at a same lateral wall of said lateral walls of the cabinet, respectively spaced at a distance above and below the contact frying surface, and a shielding being provided around the electric heating device to allow the air flow generated by the fan to flow along a path beneath the heating device and back in an opposite direction across the contact frying surface.

9. A frying apparatus as claimed in claim 4, wherein said means for controlling includes a fan mounted in connection with an air intake in said one of said lateral walls of the cabinet.

10. A frying apparatus as claimed in claim 3, wherein the cabinet is designed with a relatively low height, the electrical heating device being arranged with a contact frying surface positioned approximately halfway between the cover plate and the bottom of the cabinet, said filtering device and said fan being positioned at a same lateral wall of said lateral walls of the cabinet, respectively spaced at a distance above and below the contact frying surface, and a shielding being provided around the electric heating device to allow the air flow generated by the fan to flow along a path beneath the heating device and back in an opposite direction across the contact frying surface.

11. A frying apparatus as claimed in claim 10, wherein the heating device is controlled to preheat the air flow to a predetermined temperature while flowing between the heating device and said bottom wall.

12. A frying apparatus as claimed in claim 11, wherein said predetermined temperature amounts approximately to 50° C.

13. A frying apparatus as claimed in claim 3, wherein said means for controlling includes a fan mounted in connection with an air intake in said one of said lateral walls of the cabinet.

14. A frying apparatus as claimed in claim 1, wherein said means for controlling includes a fan mounted in connection with an air intake in said one of said lateral walls of the cabinet.

15. A frying apparatus as claimed in claim 1, wherein the cabinet is designed as an installation kit.

* * * * *